United States Patent
Dana et al.

(10) Patent No.: US 11,402,498 B1
(45) Date of Patent: *Aug. 2, 2022

(54) RADAR SYSTEM AND METHOD FOR DETECTING HAZARDS ASSOCIATED WITH PARTICLES OR BODIES

(71) Applicant: Rockwell Collins, Inc., Cedar Rapids, IA (US)

(72) Inventors: Roger A. Dana, Marion, IA (US); James B. West, Cedar Rapids, IA (US); Kevin M. Kronfeld, Cedar Rapids, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/071,289

(22) Filed: Oct. 15, 2020

Related U.S. Application Data

(63) Continuation of application No. 14/853,471, filed on Sep. 14, 2015, now Pat. No. 10,809,375.

(51) Int. Cl.
*G01S 13/95* (2006.01)
*G01S 7/02* (2006.01)
*G01S 7/04* (2006.01)
*G01S 13/89* (2006.01)

(52) U.S. Cl.
CPC ............ *G01S 13/953* (2013.01); *G01S 7/024* (2013.01); *G01S 7/04* (2013.01); *G01S 13/89* (2013.01)

(58) Field of Classification Search
CPC .... G01S 13/95–958; G01S 13/89; G01S 7/04; G01S 7/024; G01S 7/4008; G01S 13/12; G01S 13/22–227
See application file for complete search history.

(56) References Cited

U.S. PATENT DOCUMENTS

| | | |
|---|---|---|
| 3,251,057 A | 5/1966 | Buehler et al. |
| 3,359,557 A | 12/1967 | Fow et al. |
| 3,404,396 A | 10/1968 | Buehler et al. |
| 3,465,339 A | 9/1969 | Marner |
| 3,491,358 A | 1/1970 | Hicks |
| 3,508,259 A | 4/1970 | Andrews |
| 3,540,829 A | 11/1970 | Collinson et al. |
| 3,567,915 A | 3/1971 | Altshuler et al. |
| 3,646,555 A | 2/1972 | Atlas |

(Continued)

FOREIGN PATENT DOCUMENTS

| | | |
|---|---|---|
| EP | 1329738 A1 | 7/2003 |
| FR | 2658617 B1 | 10/1992 |

(Continued)

OTHER PUBLICATIONS

3-D Weather Hazard and Avoidance System, Honeywell InteVue Brochure dated Nov. 2008, 4 pages.

(Continued)

*Primary Examiner* — Matthew M Barker
(74) *Attorney, Agent, or Firm* — Suiter Swantz pc llo

(57) ABSTRACT

The hazard warning system includes processing system for detecting an HVB condition. The aircraft warning system can use at least two types of radar returns and can measure decorrelation time to detect the HVB condition. Warnings of HVB conditions can allow an aircraft to avoid threats posed by such conditions including damage to aircraft equipment and engines.

11 Claims, 9 Drawing Sheets

(56) References Cited

U.S. PATENT DOCUMENTS

| | | |
|---|---|---|
| 3,715,748 A | 2/1973 | Hicks |
| 3,764,719 A | 10/1973 | Dell |
| 3,781,530 A | 12/1973 | Britland et al. |
| 3,781,878 A | 12/1973 | Kirkpatrick |
| 3,803,609 A | 4/1974 | Lewis et al. |
| 3,885,237 A | 5/1975 | Kirkpatrick |
| 3,943,511 A | 3/1976 | Evans et al. |
| 3,964,064 A | 6/1976 | Brandao et al. |
| 3,968,490 A | 7/1976 | Gostin |
| 4,015,257 A | 3/1977 | Fetter |
| 4,043,194 A | 8/1977 | Tanner |
| 4,223,309 A | 9/1980 | Payne |
| 4,283,715 A | 8/1981 | Choisnet |
| 4,283,725 A | 8/1981 | Chisholm |
| 4,318,100 A | 3/1982 | Shimizu et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,937 A | 9/1986 | Batty, Jr. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,894,661 A | 1/1990 | Furuno et al. |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor, Jr. et al. |
| 5,198,819 A | 3/1993 | Susnjara |
| 5,202,690 A | 4/1993 | Frederick |
| 5,208,600 A | 5/1993 | Rubin |
| 5,221,924 A | 6/1993 | Wilson |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A | 11/1998 | Stern et al. |
| 5,839,080 A | 11/1998 | Muller et al. |
| 5,907,568 A | 5/1999 | Reitan, Jr. |
| 5,920,276 A | 7/1999 | Frederick |
| 5,945,926 A | 8/1999 | Ammar et al. |
| 5,973,635 A | 10/1999 | Albo |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,339,747 B1 | 1/2002 | Daly et al. |
| 6,340,946 B1 | 1/2002 | Wolfson et al. |
| 6,377,202 B1 | 4/2002 | Kropfli et al. |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 | 8/2002 | Kelly et al. |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday, Jr. et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,898,151 B1 | 5/2005 | Lyon |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose, Jr. et al. |
| 7,109,912 B1 | 9/2006 | Paramore et al. |
| 7,109,913 B1 | 9/2006 | Paramore et al. |
| 7,116,266 B1 | 10/2006 | Vesel et al. |
| 7,129,885 B1 | 10/2006 | Woodell et al. |

(56) References Cited

U.S. PATENT DOCUMENTS

| | | |
|---|---|---|
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 | 1/2007 | Finley et al. |
| 7,200,491 B1 | 4/2007 | Rose, Jr. et al. |
| 7,205,928 B1 | 4/2007 | Sweet |
| 7,242,343 B1 | 7/2007 | Woodell |
| 7,259,714 B1 | 8/2007 | Cataldo |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,307,586 B2 | 12/2007 | Peshlov et al. |
| 7,307,756 B2 | 12/2007 | Walmsley |
| 7,352,317 B1 | 4/2008 | Finley et al. |
| 7,352,929 B2 | 4/2008 | Hagen et al. |
| 7,365,674 B2 | 4/2008 | Tillotson et al. |
| 7,372,394 B1 | 5/2008 | Woodell et al. |
| 7,383,131 B1 | 6/2008 | Wey et al. |
| 7,417,578 B1 | 8/2008 | Woodell et al. |
| 7,417,579 B1 | 8/2008 | Woodell |
| 7,427,943 B1 | 9/2008 | Kronfeld et al. |
| 7,436,361 B1 | 10/2008 | Paulsen et al. |
| 7,471,995 B1 | 12/2008 | Robinson |
| 7,486,219 B1 | 2/2009 | Woodell et al. |
| 7,486,220 B1 | 2/2009 | Kronfeld et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,613 B1 | 5/2009 | Thompson et al. |
| 7,541,971 B1 | 6/2009 | Woodell et al. |
| 7,557,735 B1 | 7/2009 | Woodell et al. |
| 7,576,680 B1 | 8/2009 | Woodell |
| 7,581,441 B2 | 9/2009 | Barny et al. |
| 7,598,901 B2 | 10/2009 | Tillotson et al. |
| 7,598,902 B1 | 10/2009 | Woodell et al. |
| 7,633,428 B1 | 12/2009 | McCusker et al. |
| 7,633,431 B1 | 12/2009 | Wey et al. |
| 7,664,601 B2 | 2/2010 | Daly, Jr. |
| 7,696,920 B1 | 4/2010 | Finley et al. |
| 7,696,921 B1 | 4/2010 | Finley et al. |
| 7,714,767 B1 | 5/2010 | Kronfeld et al. |
| 7,728,758 B2 | 6/2010 | Varadarajan et al. |
| 7,733,264 B1 | 6/2010 | Woodell et al. |
| 7,859,448 B1 | 12/2010 | Woodell et al. |
| 7,868,811 B1 | 1/2011 | Woodell et al. |
| 7,917,255 B1 | 3/2011 | Finley |
| 7,932,853 B1 | 4/2011 | Woodell et al. |
| 7,973,698 B1 | 7/2011 | Woodell et al. |
| 7,982,658 B2 | 7/2011 | Kauffman et al. |
| 8,022,859 B2 | 9/2011 | Bunch et al. |
| 8,054,214 B2 | 11/2011 | Bunch |
| D650,275 S | 12/2011 | Dunwoody |
| 8,072,368 B1 | 12/2011 | Woodell |
| 8,081,106 B2 | 12/2011 | Yannone |
| 8,089,391 B1 | 1/2012 | Woodell et al. |
| 8,098,188 B2 | 1/2012 | Costes et al. |
| 8,098,189 B1 | 1/2012 | Woodell et al. |
| 8,111,186 B2 | 2/2012 | Bunch et al. |
| 8,159,369 B1 | 4/2012 | Koenigs et al. |
| 8,217,828 B2 | 7/2012 | Kirk |
| 8,228,227 B2 | 7/2012 | Bunch et al. |
| 8,314,730 B2 | 11/2012 | Musiak et al. |
| 8,332,084 B1 | 12/2012 | Bailey et al. |
| 8,344,937 B2 | 1/2013 | Drake et al. |
| 8,456,349 B1 | 6/2013 | Piesinger |
| 8,570,211 B1 | 10/2013 | Piesinger |
| 8,601,864 B1 | 12/2013 | Eilts et al. |
| 8,723,719 B1 | 5/2014 | Piesinger |
| 8,742,977 B1 | 6/2014 | Piesinger |
| 8,902,100 B1 | 12/2014 | Woodell et al. |
| 9,019,146 B1 | 4/2015 | Finley et al. |
| 9,134,418 B1 | 9/2015 | Kronfeld et al. |
| 9,244,166 B1 | 1/2016 | Finley et al. |
| 9,507,022 B1 | 11/2016 | Breiholz et al. |
| 9,720,082 B1 | 8/2017 | Dana et al. |
| 2002/0039072 A1 | 4/2002 | Gremmert et al. |
| 2002/0126039 A1 | 9/2002 | Dalton et al. |
| 2003/0001770 A1 | 1/2003 | Cornell et al. |
| 2003/0025627 A1 | 2/2003 | Wilson et al. |
| 2003/0117311 A1 | 6/2003 | Funai |
| 2003/0193411 A1 | 10/2003 | Price |
| 2004/0183695 A1 | 9/2004 | Ruokangas et al. |
| 2004/0239550 A1 | 12/2004 | Daly |
| 2005/0049789 A1 | 3/2005 | Kelly et al. |
| 2005/0174350 A1 | 8/2005 | Ridenour et al. |
| 2006/0036366 A1 | 2/2006 | Kelly et al. |
| 2007/0005249 A1 | 1/2007 | Dupree et al. |
| 2007/0152867 A1 | 7/2007 | Randall |
| 2008/0158049 A1 | 7/2008 | Southard et al. |
| 2009/0177343 A1 | 7/2009 | Bunch et al. |
| 2009/0219197 A1 | 9/2009 | Bunch |
| 2010/0019938 A1 | 1/2010 | Bunch |
| 2010/0042275 A1 | 2/2010 | Kirk |
| 2010/0110431 A1 | 5/2010 | Ray et al. |
| 2010/0194628 A1 | 8/2010 | Christianson et al. |
| 2010/0201565 A1 | 8/2010 | Khatwa |
| 2010/0245164 A1 | 9/2010 | Kauffman |
| 2010/0245165 A1 | 9/2010 | Kauffman et al. |
| 2010/0302094 A1 | 12/2010 | Bunch et al. |
| 2011/0074624 A1 | 3/2011 | Bunch |
| 2011/0148692 A1 | 6/2011 | Christianson |
| 2011/0148694 A1 | 6/2011 | Bunch et al. |
| 2011/0187588 A1 | 8/2011 | Khatwa et al. |
| 2012/0029786 A1 | 2/2012 | Calandra et al. |
| 2012/0133551 A1 | 5/2012 | Pujol et al. |
| 2012/0139778 A1 | 6/2012 | Bunch et al. |
| 2013/0226452 A1 | 8/2013 | Watts |
| 2013/0234884 A1 | 9/2013 | Bunch et al. |
| 2013/0257641 A1 | 10/2013 | Ronning |
| 2014/0039734 A1 | 2/2014 | Ramaiah et al. |
| 2014/0176362 A1 | 6/2014 | Sneed |
| 2014/0362088 A1 | 12/2014 | Veillette et al. |

FOREIGN PATENT DOCUMENTS

| | | |
|---|---|---|
| WO | 9807047 A1 | 2/1998 |
| WO | 9822834 A1 | 5/1998 |
| WO | 03005060 A1 | 1/2003 |
| WO | 2009137158 A1 | 11/2009 |

OTHER PUBLICATIONS

Advisory Action for U.S. Appl. No. 12/075,103, dated Feb. 13, 2013, 3 pages.
Advisory Action for U.S. Appl. No. 12/075,103, dated Nov. 8, 2010, 3 pages.
Advisory Action for U.S. Appl. No. 12/075,103, dated Oct. 15, 2010, 3 pages.
Boudevillain et al., 2003, Assessment of Vertically Integrated Liquid (VIL) Water Content Radar Measurement, J. Atmos. Oceanic Technol., 20, 807-819.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corrected Notice of Allowance received in U.S. Appl. No. 14/681,901 dated Feb. 23, 2016, 2 pages.
Corridor Integrated Weather System (CIWS), www.ll.mit.edu/mission/aviation/faawxsystems/ciws.html, received on Aug. 19, 2009, 3 pages.
Decision on Appeal for Inter Parties Reexamination Control No. 95/001,860, dated Oct. 17, 2014, 17 pages.
Doviak et al., Doppler Radar and Weather Observations, 1984, 298 pages.
Doviak et al., Doppler Radar and Weather Observations, 1984, 298 pages. (Uploaded in two parts).
Dupree et al.,FAA Tactical Weather Forecasting in the United States National Airspace, Proceedings from the World Weather Research

(56) References Cited

OTHER PUBLICATIONS

Symposium on Nowcasting and Very Short Term Forecasts, Toulouse, France, 2005, 29 pages.
Final Office Action on U.S. Appl. No. 12/892,663 dated Mar. 7, 2013, 13 pages.
Final Office Action on U.S. Appl. No. 13/238,606 dated Apr. 1, 2014, 11 pages.
Final Office Action on U.S. Appl. No. 13/238,606 dated Jan. 22, 2015, 6 pages.
Final Office Action on U.S. Appl. No. 13/246,769 dated Sep. 16, 2014, 18 pages.
Final Office Action on U.S. Appl. No. 13/717,052, dated Nov. 13, 2015, 10 pages.
Goodman et al., LISDAD Lightning Observations during the Feb. 22-23, 1998 Central Florida Tornado Outbreak, http: www.srh.noaa.gov/topics/attach/html/ssd98-37.htm, Jun. 1, 1998, 5 pages.
Greene et al., 1972, Vertically Integrated Water—A New Analysis Tool, Mon. Wea. Rev., 100, 548-552.
Greene et al., Vertically Integrated Liquid Water—A New Analysis Tool, Monthly Weather Review, Jul. 1972, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pages.
Lahiff, 2005, Vertically Integrated Liquid Density and Its Associated Hail Size Range Across the Burlington, Vermont County Warning Area, Eastern Regional Technical Attachment, No. 05-01, 20 pages.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, 2012, 19 pages.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Non-Final Office Action on U.S. Appl. No. 12/892,663 dated May 29, 2013, 14 pages.
Non-Final Office Action on U.S. Appl. No. 13/238,606 dated Jul. 8, 2014, 12 pages.
Non-Final Office Action on U.S. Appl. No. 13/238,606 dated Mar. 27, 2015, 21 pages.
Non-Final Office Action on U.S. Appl. No. 13/238,606 dated May 27, 2015, 14 pages.
Non-Final Office Action on U.S. Appl. No. 13/238,606 dated Sep. 23, 2013, 15 pages.
Non-Final Office Action on U.S. Appl. No. 13/717,052 dated Feb. 11, 2015, 15 pages.
Non-Final Office Action on U.S. Appl. No. 13/717,052 dated Sep. 9, 2014, 8 pages.
Non-Final Office Action on U.S. Appl. No. 13/913,100 dated May 4, 2015, 25 pages.
Non-Final Office Action on U.S. Appl. No. 13/919,406 dated Jul. 14, 2015, 23 pages.
Non-Final Office Action on U.S. Appl. No. 14/086,844, dated Nov. 10, 2015, 17 pages.
Non-Final Office Action on U.S. Appl. No. 14/162,035 dated Jul. 11, 2016, 10 pages.
Non-Final Office Action on U.S. Appl. No. 14/162,035, dated Feb. 4, 2016, 9 pages.
Non-Final Office Action on U.S. Appl. No. 14/206,239 dated Jun. 16, 2016, 12 page.
Non-Final Office Action on U.S. Appl. No. 14/206,651 dated Jun. 23, 2016, 12 pages.
Non-Final Office Action on U.S. Appl. No. 14/207,034 dated Jun. 23, 2016, 14 pages.
Non-Final Office Action on U.S. Appl. No. 14/452,235 dated Apr. 23, 2015, 9 pages.
Non-Final Office Action on U.S. Appl. No. 14/465,753, dated Apr. 4, 2016, 12 pages.
Non-Final Office Action on U.S. Appl. No. 14/681,901 dated Jun. 17, 2015, 21 pages.
Non-Final Office Action on U.S. Appl. No. 15/137,645 dated Aug. 8, 2016, 6 pages.
Notice of Allowance for U.S. Appl. No. 10/631,253, dated Jul. 28, 2005, 7 pages.
Notice of Allowance for U.S. Appl. No. 11/256,845, dated May 27, 2009, 7 pages.
Notice of Allowance for U.S. Appl. No. 11/370,085, dated Dec. 30, 2008, 6 pages.
Notice of Allowance for U.S. Appl. No. 11/402,434, dated Nov. 4, 2008, 6 pages.
Notice of Allowance for U.S. Appl. No. 12/474,102, dated Jan. 20, 2012, 6 pages.
Notice of Allowance on U.S. Appl. No. 12/075,103 dated Aug. 4, 2014, 10 pages.
Notice of Allowance on U.S. Appl. No. 13/246,769 dated Jan. 8, 2015, 10 pages.
Notice of Allowance on U.S. Appl. No. 13/707,438 dated Feb. 25, 2015, 11 pages.
Notice of Allowance on U.S. Appl. No. 14/086,844, dated Jun. 22, 2016, 8 pages.
Notice of Allowance on U.S. Appl. No. 14/465,753, dated Aug. 29, 2016, 8 pages.
Notice of Allowance on U.S. Appl. No. 14/681,901, dated Dec. 23, 2015, 8 pages.
Office Action for U.S. Appl. No. 10/631,253, dated Jan. 14, 2004, 5 pages.
Office Action for U.S. Appl. No. 10/631,253, dated Jun. 30, 2004, 4 pages.
Office Action for U.S. Appl. No. 11/256,845, dated Aug. 21, 2007, 4 pages.
Office Action for U.S. Appl. No. 11/256,845, dated Dec. 5, 2006, 5 pages.
Office Action for U.S. Appl. No. 11/256,845, dated Jul. 28, 2008, 5 pages.
Office Action for U.S. Appl. No. 11/256,845, dated Jun. 22, 2006, 5 pages.
Office Action for U.S. Appl. No. 11/370,085, dated Aug. 15, 2007, 10 pages.
Office Action for U.S. Appl. No. 11/370,085, dated Dec. 4, 2007, 13 pages.
Office Action for U.S. Appl. No. 11/370,085, dated Oct. 9, 2008, 5 pages.
Office Action for U.S. Appl. No. 11/402,434, dated Jul. 17, 2008, 5 pages.
Office Action for U.S. Appl. No. 11/402,434, dated Mar. 29, 2007, 8 pages.
Office Action for U.S. Appl. No. 11/402,434, dated Oct. 26, 2006, 7 pages.
Office Action for U.S. Appl. No. 11/402,434, dated Sep. 20, 2007, 7 pages.
Office Action for U.S. Appl. No. 12/075,103, dated Feb. 26, 2010, 11 pages.
Office Action for U.S. Appl. No. 12/075,103, dated Jul. 29, 2010, 7 pages.

(56) References Cited

OTHER PUBLICATIONS

Office Action for U.S. Appl. No. 12/075,103, dated Jun. 20, 2012, 5 pages.
Office Action for U.S. Appl. No. 12/075,103, dated Nov. 29, 2012, 6 pages.
Office Action for U.S. Appl. No. 12/474,102, dated Sep. 7, 2011, 8 pages.
Office Action for U.S. Appl. No. 12/892,663, dated Oct. 22, 2012, 12 pages.
Office Action for U.S. Appl. No. 13/717,052, dated Aug. 22, 2013, 15 pages.
Office Action on U.S. Appl. No. 12/075,103 dated Apr. 9, 2014, 5 pages.
Office Action on U.S. Appl. No. 12/075,103 dated Jul. 31, 2013, 8 pages.
Office Action on U.S. Appl. No. 13/246,769 dated Apr. 21, 2014, 18 pages.
Office Action on U.S. Appl. No. 13/717,052 dated Dec. 23, 2013, 7 pages.
Office Action on U.S. Appl. No. 13/717,052 dated Mar. 27, 2014, 6 pages.
RDR-4B Honeywell User Manual for Forward Looking Windshear Detection/Weather Radar System, Rev. 6, Jul. 2003, 106 pages.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
TOA Technology, printed from website: http://www.toasystems.com/technology.html on Dec. 29, 2010, 2 pages.
Tragl K., "Doppler Correction for Scattering Matrix Measurements of Random Targets" European Transactions on Telecommunications, vol. 2, N. 3, pp. 43-49, 1991. (Year: 1991).
Triangulation, from Wikipedia, printed from website: http://en.wikipedia.org/wiki/Triangulation on Dec. 29, 2010, 6 pages.
U.S. Appl. No. 13/246,769, filed Sep. 27, 2011, Rockwell Collins, Inc.
U.S. Appl. No. 13/717,052, filed Dec. 17, 2012, Daniel L. Woodell et al.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/162,035, filed Jan. 23, 2014, Kevin M. Kronfeld et al.
U.S. Appl. No. 14/206,239, filed Mar. 12, 2014, Rockwell Collins, Inc.
U.S. Appl. No. 14/206,651, filed Mar. 12, 2014, Rockwell Collins, Inc.
U.S. Appl. No. 14/207,034, filed Mar. 12, 2014, Rockwell Collins, Inc.
U.S. Appl. No. 14/323,766, filed Jul. 3, 2014, Weichbrod et al.
U.S. Appl. No. 14/465,730, filed Aug. 21, 2014, Breiholz et al.
U.S. Appl. No. 14/465,753, filed Aug. 21, 2014, Aden E. Breiholz et al.
U.S. Appl. No. 14/608,071, filed Jan. 28, 2015, Breiholz et al.
U.S. Office Action on U.S. Appl. No. 13/238,606 dated Jul. 8, 2014, 12 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, paper presented on Oct. 16, 2005, 10 pages.
Zipser et al., The Vertical Profile of Radar Reflectivity and Convective Cells: A Strong Indicator of Storm Intensity and Lightning Probability? America Meteorological Society, 1994, 9 pages.
Zipser, Edward J. et al., The Vertical Profile of Radar Reflectivity of Convective Cells: A Strong Indicator of Storm Intensity and Lightning Probability?, American Meteorological Society, Aug. 1994, 9 pages.

RADAR SYSTEM AND METHOD FOR DETECTING HAZARDS ASSOCIATED WITH PARTICLES OR BODIES

CROSS REFERENCE TO RELATED APPLICATIONS

The present application is a continuation of U.S. application Ser. No. 14/853,471 filed on Sep. 14, 2015. The present application is related to U.S. application Ser. No. 14/681,901 filed on Apr. 8, 2015 which is a continuation of U.S. application Ser. No. 13/246,769 filed on Sep. 27, 2011, U.S. application Ser. No. 14/206,651 filed on Mar. 12, 2014, U.S. application Ser. No. 14/086,844 filed on Nov. 21, 2013, U.S. application Ser. No. 13/919,406 filed on Jun. 17, 2013, U.S. application Ser. No. 13/841,893 filed Mar. 15, 2013, U.S. application Ser. No. 14/207,034 filed on Mar. 12, 2014 invented by Koenigs, et al., U.S. application Ser. No. 13/246,769 filed Sep. 27, 2011 and U.S. application Ser. No. 14/206,239, filed on Mar. 12, 2104 invented by Sishtla, et al., all incorporated herein by reference in their entireties and assigned to the assignee of the present application.

BACKGROUND

Conventional aircraft hazard weather radar systems, such as the WXR 2100 MultiScan™ radar system manufactured by Rockwell Collins, Inc., have Doppler processing and are capable of detecting at least four parameters: weather range, weather reflectivity, weather velocity, and weather spectral width or velocity variation. The weather reflectivity is typically scaled to green, yellow, and red color levels that are related to rainfall rate. The radar-detected radial velocity variation can be scaled to a turbulence level and displayed as magenta. Such weather radar systems can conduct vertical sweeps and obtain reflectivity parameters at various altitudes.

Particles and bodies such as high altitude ice crystals (HAIC), volcanic ash, and birds (HVB), pose threats to aircraft and their components. Particles can also include smoke clouds from forest fires. For example, sensors can provide improper readings when clogged by ice or other particles. Probes and engines can also be susceptible to damage caused by mixed phase and glaciated ice crystals when operating near areas of deep convection and at higher altitudes, caused by ingestion of one or more birds into the engine, or caused by operation in clouds associated with smoke or ash from forest fires or volcanic activity. Engine rollback issues are believed to be related to ice crystal accretion, followed by aggregate detachment in solid form before continuing through the aircraft engine.

Conventional X-band radar systems have insufficient per pulse energy on the target to detect and discriminate HVB based upon reflectivity levels alone especially at longer ranges. Distinguishing low reflectivity precipitation areas from areas of high altitude associated threat (HAAT), high altitude ice crystal (HAIC) formation and HAIC clouds (HAIC$^2$) and other small particle clouds can be difficult. Detection and display of conditions associated with ice crystals, smoke, volcanic ash, and birds are desirous because such conditions can have a direct impact on aircraft, crew and passengers depending on the severity.

Thus, there is a need for an aircraft hazard warning system and method that senses ice crystals, smoke, volcanic ash, and birds (e.g., HVB) conditions. There is also a need for a hazard detection system that detects and displays warnings associated with ice crystals, smoke, volcanic ash, and birds. There is also a need for a weather radar system and method for detecting low density particle clouds driven by atmospheric turbulence. There is further a need for a weather radar system and method for detecting low density particle condition at sufficient range to allow aircraft to avoid the condition. Yet further, there is a need for a low cost, light weight, low power aircraft hazard warning system that alerts a pilot to warnings associated with ice crystals, smoke, volcanic ash, and birds.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

In certain aspects, embodiments of the inventive concepts disclosed are directed to an aircraft hazard warning system. The aircraft hazard warning system includes a processing system detecting an HVB condition using at least two types of radar signals (e.g., two or more types of frequency or two or more types of polarization). The processing system provides a number of pulses at a pulse repetition frequency via a radar antenna system and receives radar return data associated with the number of pulses via the radar antenna system.

In further aspects, embodiments of the inventive concepts disclosed are directed to a method of using a radar system to detect a particle condition. The method includes determining a number of pulses per dwell for a first decorrelation time of radar returns, providing the number of pulses at a pulse repetition frequency via a radar antenna system, and receiving radar return data associated with the number of pulses via the radar antenna system. The method also includes determining if a signal-to-noise ratio of returns associated with the dwell is above a threshold, and processing the radar return data to detect the particle condition.

In further aspects, embodiments of the inventive concepts disclosed are directed to an aircraft weather radar system. The aircraft weather radar system includes a radar antenna for receiving radar returns, and an electronic processor configured to detect a particle cloud. The electronic processor provides a number of pulses at a pulse repetition frequency via the radar antenna and receives radar return data associated with the number of pulses via the radar antenna. The number of pulses is chosen in response to a measured decorrelation time of the radar returns.

Another exemplary embodiment relates to an aircraft weather radar system. The aircraft weather radar system includes a radar antenna for receiving radar returns, and an electronic processor determining an HVB condition in response to at least two types of radar returns.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

Referring generally to the FIGURES, systems and methods for indicating a weather threat to an aircraft are described, according to an exemplary embodiment. An airborne weather radar system is generally configured to project radar beams and to receive radar returns relating to the projected radar beams in some embodiments. The projected radar beams generally pass through air and reflect off of targets (e.g., rain, snow, birds, ice crystals, smoke, ash etc.). Using the reflected return data, processing electronics associated with the weather radar system can detect the targets and the type of targets in some embodiments. The weather radar system is advantageously configured to display the detected conditions (e.g., HVB conditions) using indicators of the detected conditions in some embodiments. For example, the weather radar system can provide HVB threat warnings to allow pilots to avoid regions detrimental to aircraft and their engines.

In some embodiments, the hazard warning system uses a multiple polarization and/or multi frequency techniques to detect particle clouds, such as HVB, by matching the polarization ellipse to the orientation and shape of the small particles (e.g., at low concentrations (less than or equal to 1 $g/m^3$ for ice and less than or equal to 0.1 $g/m^3$ for ash)). For example, the ability to measure hydrometer shape and orientation allows discrimination of thermodynamic phase of water and ice particles. In some embodiments, the weather radar system detects low-density threatening particle clouds (e.g., ice or volcanic ash) at long range so that aircraft can be steered around threat. The weather radar system employs frequency hopping to decorrelate scattering from the cloud from dwell to dwell (e.g., using a carrier frequency range of plus or minus four or eight MHz is sufficient to decorrelate radar cross section (RCS) under most conditions) in some embodiments.

In some embodiments, the weather radar system takes advantage of turbulence coherence times to perform coherent integration within a dwell as minimum coherence times are expected to be on the order of milliseconds, thereby allowing multiple pulse coherent integration with a greater than 1 kilohertz (kHz) pulse repetition frequency (PRF) waveform. The turbulence decorrelates RCS over the period of multiple dwells in some embodiments. In some embodiments, a mixture of coherent and non-coherent processing is selected to increase probability of detection (e.g., based on coherent integration loss of 1 dB or less for representative atmospheric turbulence spectra or based on optimum number of non-coherent dwells per cloud observation).

Figure 1:
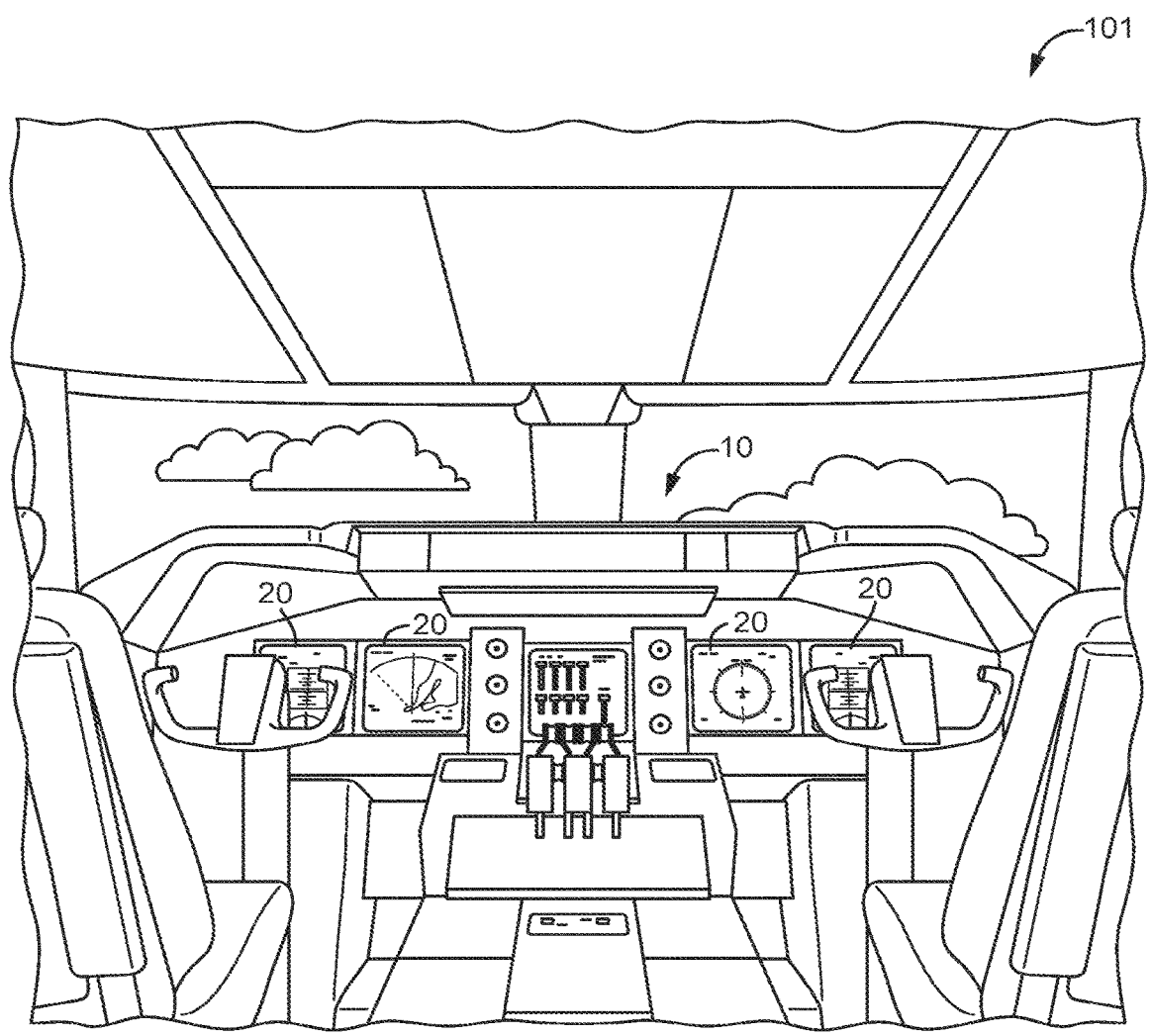
FIG. 1 is a perspective view schematic illustration of an aircraft control center, according to some embodiments.

Referring now to FIG. 1, an illustration of an aircraft control center or cockpit 10 is shown for an aircraft 101, according to an exemplary embodiment. The aircraft control center 10 includes flight displays 20 which are generally used to increase visual range and to enhance decision-making abilities. In an exemplary embodiment, the flight displays 20 may provide an output from a warning system (e.g., a radar system 300 (FIG. 2)) of the aircraft. For example, the flight displays 20 may provide a top-down view, a horizontal view, vertical view/perspective or 3 dimensional view, or any other view of weather, small particle conditions and/or terrain detected by the radar system 300 on the aircraft. The aircraft control center 10 may further include other user interface elements such as an audio device (e.g., speaker, electro-acoustic transducer, etc.) and illuminating or flashing lamps. Weather can be displayed as colored regions on the aircraft 101 according to weather radar standards. In some embodiments, one or more of a HAIC, $HAIC^2$, HAAT, bird, smoke, or ash, or other particle condition warning can be provided on any of the displays 20 as part of a weather radar display.

Figure 2:
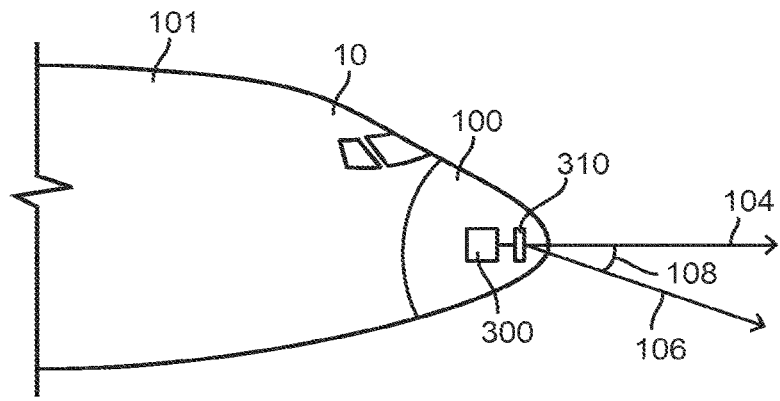
FIG. 2 is a side view schematic illustration of the nose of an aircraft including a radar system, according to some embodiments.

Referring to FIG. 2, the front of the aircraft 101 is shown with aircraft control center 10 and nose 100, according to an exemplary embodiment. The radar system 300 (e.g., a weather radar system or other radar system) is generally located within nose 100 of aircraft 101 or within aircraft control center 10 of aircraft 101. According to various exemplary embodiments, the radar system 300 may be located on the top of aircraft 101 or on the tail of the aircraft 101 instead. The radar system 300 may include or be coupled to an antenna system 310. A variety of different antennas or radar circuits may be used as part of system 300 (e.g., a split aperture antenna, a monopulse antenna, a sequential lobbing antenna, active electronically scanned antenna array (AESA), passive electronically scanned antenna array (PESA), etc.). In certain embodiments, the antenna system 310 is a dual or more than dual frequency antenna and/or a dual or more than dual polarization antenna.

The radar system 300 sweeps a radar beam 104, 106 horizontally back and forth across the sky. The radar system 300 conducts a first horizontal sweep (e.g., the beam 104) directly in front of the aircraft 101 and a second horizontal sweep (e.g., the beam 106) downward at some tilt angle 108 (e.g., 20 degrees down) in some embodiments. The sweep can include radar signals at multiple frequencies or polarizations. The radar system 300 can be a WXR-2100 Multi-Scan™ radar system or similar system manufactured by Rockwell Collins and configured as described herein. According to other embodiments, the radar system 300 can be an RDR-4000 system or similar system manufactured by Honeywell International, Inc. configured as described herein. The radar system 300 may be integrated with other avionic equipment and user interface elements in aircraft control center 10 (e.g., the flashing lights, the displays 20, display elements on a weather radar display, display elements on a terrain display, the audio alerting devices, navigation systems, TAWs equipment, etc.).

Figure 3:
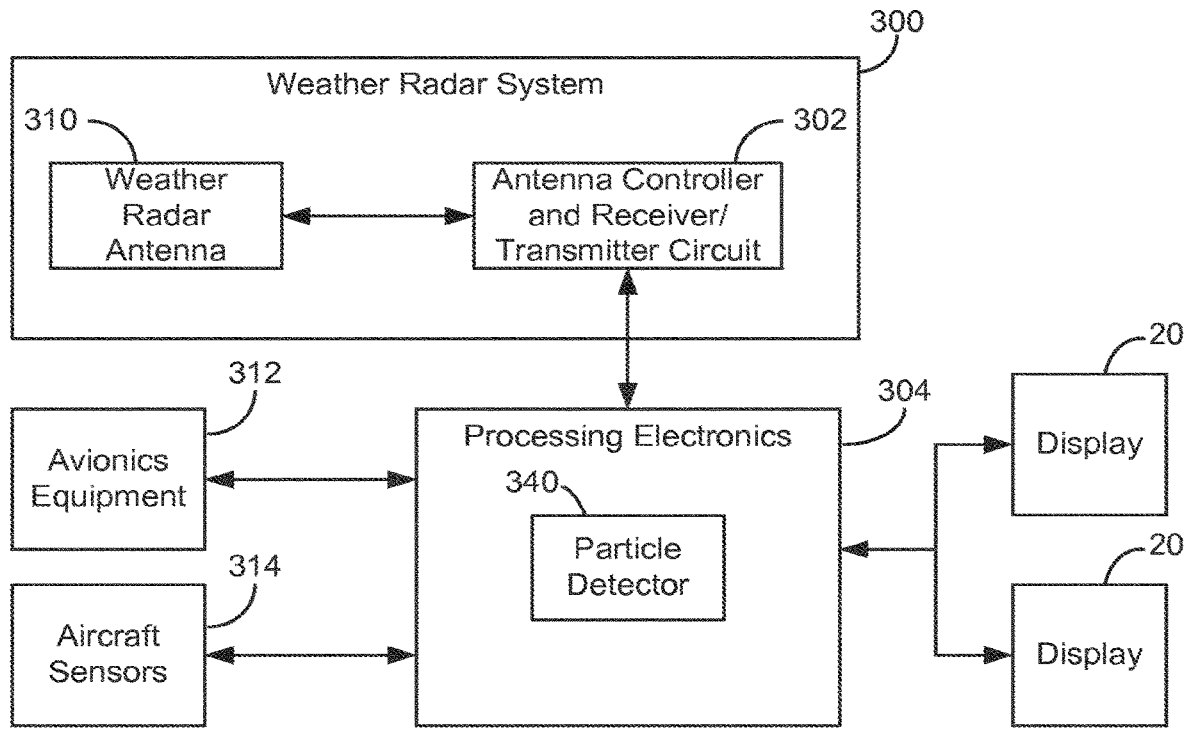
FIG. 3 is a schematic block diagram of the radar system illustrated in FIG. 2 including a particle detector, according to some embodiments.

Referring to FIG. 3, a block diagram of the radar system 300 embodied as a weather radar system is shown, according to an exemplary embodiment. The radar system 300 is shown to include the antenna system 310 connected (e.g., directly, indirectly) to an antenna controller and receiver/transmitter circuit 302. The antenna controller and receiver/transmitter circuit 302 may include any number of mechanical or electrical circuitry components or modules for steering a radar beam. For example, the antenna controller and receiver/transmitter circuit 302 can be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). The antenna controller and receiver/transmitter circuit 302 can be configured to conduct the actual signal generation that results in a radar beam being provided from the radar antenna system 310 and to conduct the reception of returns received at the radar antenna system 310. Radar return data is provided from the antenna controller and receiver/transmitter circuit 302 to the processing electronics 304 for processing. For example, the processing electronics 304 can be configured to interpret the returns for display on the displays 20.

The processing electronics 304 can also be configured to provide control signals or control logic to antenna controller and receiver/transmitter circuit 302. For example, depending on pilot or situational inputs, the processing electronics 304 can be configured to cause the antenna controller and receiver/transmitter circuit 302 to change behavior or radar beam patterns. In other words, the processing electronics 304 can include the processing logic for operating the radar system 300. It should be noted that the processing electronics 304 may be integrated into the radar system 300 or located remotely from the radar system 300, for example, with other equipment or as stand-alone equipment in the aircraft control center 10.

The processing electronics 304 are further shown as connected to aircraft sensors 314 which may generally include any number of sensors configured to provide data to the processing electronics 304. For example, the sensors 314 could include temperature sensors, humidity sensors, infrared sensors, altitude sensors, a gyroscope, a global positioning system (GPS), communication units, or any other aircraft-mounted sensors that may be used to provide data to the processing electronics 304. It should be appreciated that the sensors 314 (or any other component shown connected to the processing electronics 304) may be indirectly or directly connected to the processing electronics 304. The processing electronics 304 are further shown as connected to avionics equipment 312 and include a particle detector 340. The particle detector 340 detects and locates at least one of a HAIC condition, a $HAIC^2$ condition, a HAAT condition, a smoke condition, a bird condition, an ash condition or other small particle conditions in the atmosphere associated with the aircraft 101 and causes one or more of the displays 20 to provide a visual and/or audio warning of such conditions. The particle detector 340 processes data associated with weather radar reflectivity levels and/or data from other sensors (e.g., temperature, altitude, external weather data from a communication unit, etc.) to provide appropriate beams for detecting the particle conditions and to detect the particle conditions. The conditions can be sensed via a dual or more frequency or dual or more polarization process as explained below and in the applications incorporated herein by reference according to various exemplary embodiments. In some embodiments, the particle detector 340 determines a suitable decorrelation time of the radar returns and adjusts the waveform provided by the radar system 300 using the antenna controller and receiver/transmitter circuit 302 and the radar antenna system 310 so that probability of detection of HVB or other particle conditions is increased.

The avionics equipment 312 can be or include a flight management system, a navigation system, a backup navigation system, communication units, or another aircraft system configured to provide inputs to processing electronics 304. The avionics equipment can provide weather data from external sources in some embodiments. The processing electronics 304 may be or include one or more microprocessors, an application specific integrated circuit (ASIC), a circuit containing one or more processing components, a group of distributed processing components, circuitry for supporting a microprocessor, or other hardware configured for processing. In some embodiments, processing electronics 304 are configured to execute computer code, a routine or module to complete and facilitate the activities described herein associated with the particle detector 340.

The radar return data processed by the particle detector 340 can be stored according to a variety of schemes or formats. The radar returns are stored in time so that decorrelation time can be measured. For example, the radar return data may be stored in an x,y or x,y,z format, a heading-up format, a north-up format, a latitude-longitude format, a radial format, or any other suitable format for storing spatial-relative information. The particle detector 340 can use any of the techniques described in U.S. application Ser. Nos. 14/086,844, 14/207,034, 14/206,239, 13/919,406 and 13/841,893 incorporated herein by reference in their entireties to process the radar return data and provide a warning.

In some embodiments, the particle detector 340 includes logic for using radar returns to make one or more determinations or inferences regarding threats related to particle conditions. The particle detector 340 and the radar system 300 can be configured to use dual or multi frequency or dual or multi polarization processes to detect presence of the particle condition and its location in some embodiments. The dual or multi frequency and dual or multi polarization techniques advantageously allow for providing information on the nature of the scattering environment. The particle detector 340 and the radar system 300 can utilize an inferred or non-inferred process discussed in related U.S. patent application Ser. No. 14/206,239 incorporated herein by reference in some embodiments. In one embodiment, the particle detector 340 and the radar system 300 receives data associated with weather returns and processes the data to determine existence of a particle condition. The data can be processed by comparing the data representing returns of a first type (e.g., polarization or frequency) and returns of a second type (e.g., polarization or frequency) to known return characteristics to determine a match to the condition. In some embodiments, the data can be processed to determine existence of Swerling 1 or Swerling 2 targets which provide an indication of whether a low density particle cloud is present (e.g., an ice condition, an ash condition, a smoke condition, etc.)

Figure 4:
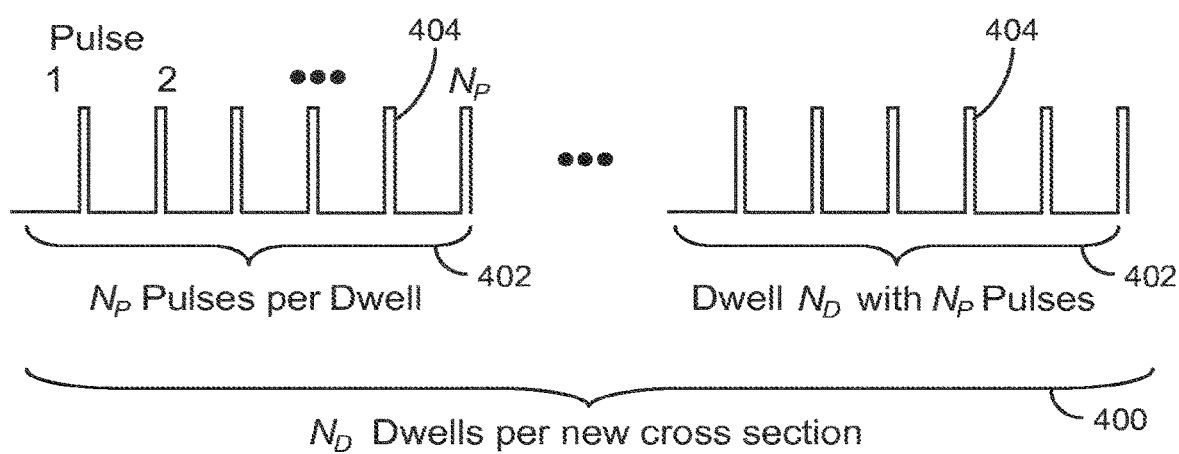
FIG. 4 is a schematic representation of a radar signal comprised of a look (which is comprised of a number of dwells which are each comprised of a number of pulses) for the radar system illustrated in FIG. 3, according to some embodiments.

With reference to FIG. 4, the radar system 300 provides a radar beam including a look 400. The look 400 includes a number of dwells 402 ($N_D$) which each include a number of pulses 404. The number of dwells 402 can be an integer from 1 to N in some embodiments. The number of pulses 404 ($N_P$) in each dwell 402 can be an integer from 1 to M in some embodiments. M and N can be any integer 1, 2, 3, . . . , 10, . . . , 100, . . . . The pulses are provided at a pulse repetition frequency (PRF). Each of the pulses 404 is defined by duration of "transmitter on" time for pulsed radar such as the radar system 300. Each of the dwells 402 is defined by a time of duration over which pulse returns are coherent. The look 400 is defined by the time of duration of dedicated detection observations. The radar system 300 selects a number of pulses and the pulse repetition frequency in accordance with a decorrelation time to detect HVB and other particle conditions in some embodiments. The pulses can by at varying frequencies and polarities. The radar system 300 selects a number of dwells in accordance with atmospheric to increase probability of detect HVB detection in some embodiments. The pulses can be at varying frequencies and polarities in some embodiments. Within a dwell, the frequency and polarization are constant. From dwell to dwell, the frequency may change to force radar cross section (RCS) fluctuations in some embodiments. The frequency and polarization may change from look to look in some embodiments.

Particles in the atmosphere can be categorized as Swerling 1 target and a Swerling 2 target in some embodiments. The Swerling 1 target has an exponential distribution of RCS across look to look, and the Swerling 2 Target has an exponential distribution of RCS across dwell to dwell in some embodiments. Swerling 1 or 2 RCS statistics are achieved when the RCS is comprised of many scatterers, no one of which is dominant in some embodiments. Swerling 1 or 2 RCS statistics indicate particle clouds in some embodiments. The Doppler power spectral density (PSD) can be used to determine the dwell to dwell decorrelation in some embodiments (e.g., Swerling 1 or Swerling 2).

Figure 5:
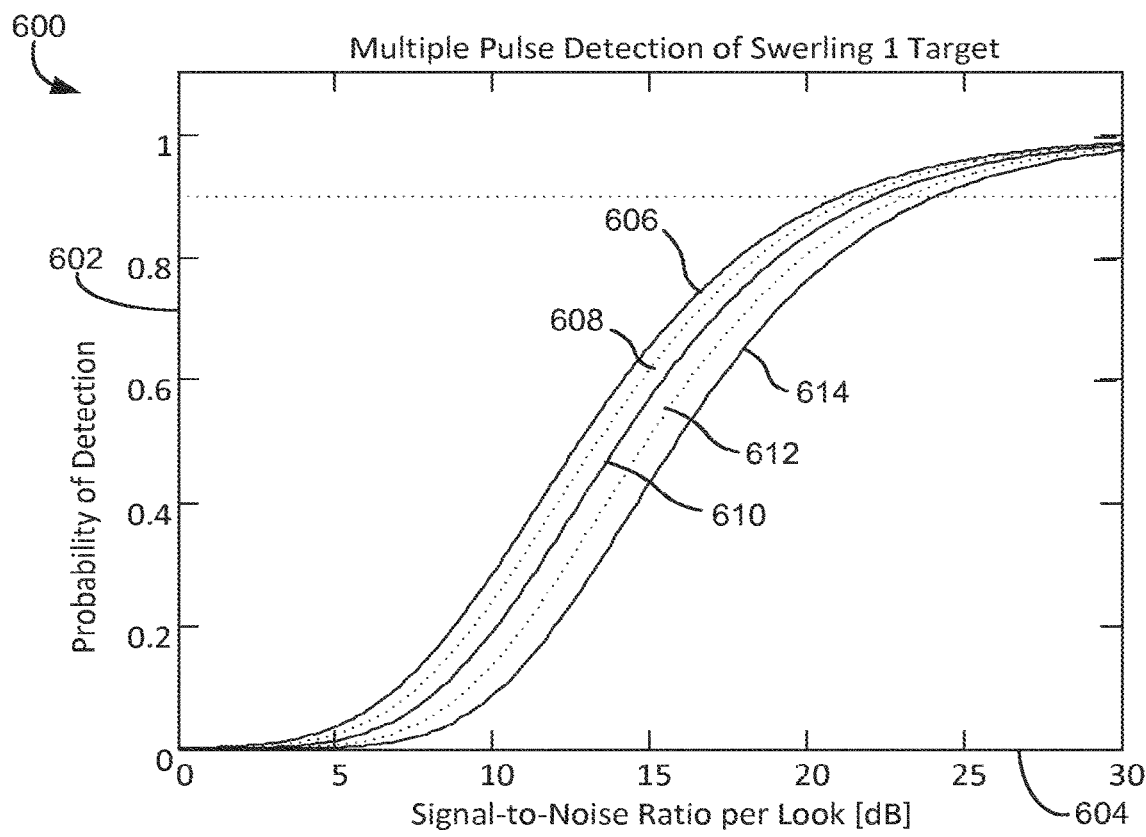
FIG. 5 is a chart showing probability of detection versus signal-to-noise ratio (SNR) per look for a Swerling 1 target for the radar system illustrated in FIG. 3 according to some embodiments.

With reference to FIG. 5, a chart 600 for a Swerling 1 target includes a Y axis 602 representing probability of detection and an X axis 604 representing signal-to-noise ratio (SNR) per look in decibels (dBs). Graphs 606, 608, 610, 612, and 614 are provided for a look with the number of dwells equal to 1, 2, 4, 8 and 16 ($N_D$=1, 2, 4, 6, 8, and 16) respectively. Chart 600 shows that an optimum number of dwells per look is one assuming that the energy on target per look is constant and is without radar cross section fluctuations in some embodiments. For a fixed total energy on target per look, providing a number of dwells greater than 1 reduces the probability of detection for Swerling 1 targets in some embodiments.

Figure 6:
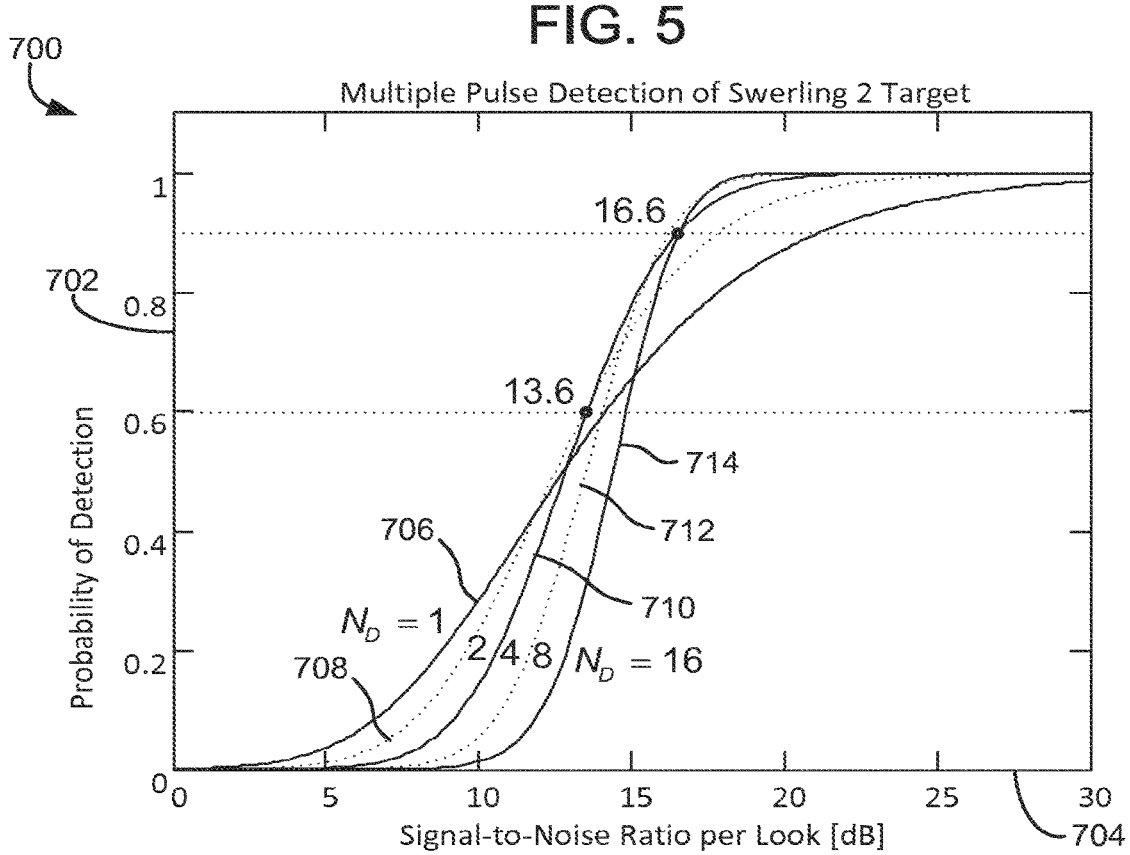
FIG. 6 is a chart showing probability of detection versus signal-to-noise ratio (SNR) per look for a Swerling 2 target for the radar system illustrated in FIG. 3 according to some embodiments.

With reference to FIG. 6, a chart 700 for a Swerling 2 target includes a Y axis 702 representing probability of detection and an X axis 704 representing signal-to-noise ratio (SNR) per look in decibels (dBs). Curves 706, 708, 710, 712, and 714 are provided for a look with the number of dwells equal to 1, 2, 4, 8 and 16 ($N_D$=1, 2, 4, 6, 8, and 16) respectively. Chart 700 shows that an optimum number of dwells ($N_D$) per look is four assuming that the energy on target per look is constant and is without radar cross section fluctuations within a dwell but fluctuates independently from dwell to dwell. A probability between 0.6 to 0.9 requires a signal-to-noise ratio of 13.6 dB to 16.6 dB per look with $N_D$ equal to four in some embodiments. Frequency hopping can be used to decorrelate the RCS dwell to dwell to achieve Swerling 2 statistics in some embodiments. In some embodiments, a carrier frequency range of plus or minus four or plus or minus eight MHz is sufficient to decorrelate RCS under most conditions. The responses using different numbers of dwells ($N_D$) can be analyzed with respect to charts 600 and 700 to classify Swerling 1 and 2 targets.

Figure 7:
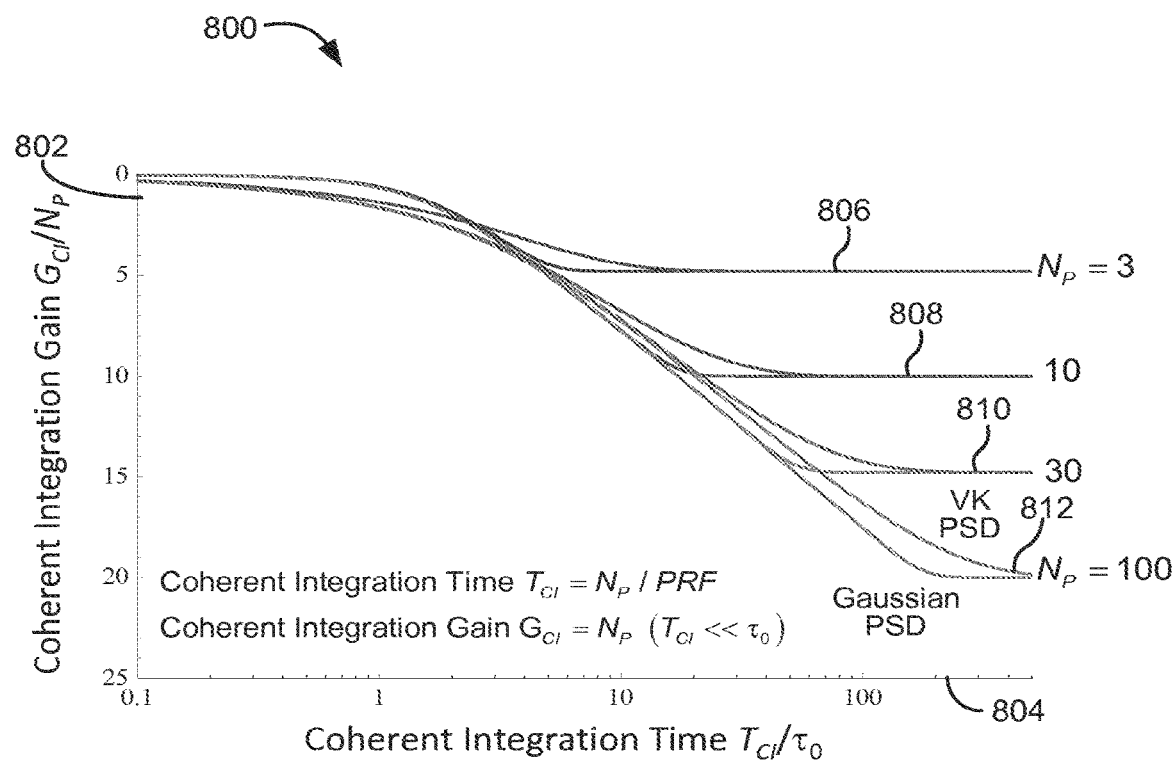
FIG. 7 is a chart showing coherent integration gain per pulse for 3, 10, 30, and 100 pulses per dwell for the radar system illustrated in FIG. 3 according to some embodiments.

With reference to FIG. 7, a chart 800 represents an environmental limit on the coherent integration period and includes a Y axis 802 representing coherent integration gain per pulse ($G_{ci}/N_p$) and an X axis 804 representing the ratio of the coherent integration time to the decorrelation time on a logarithmic scale on a logarithmic scale. The coherent integration time ($T_{CI}$) equals $N_P$/PRF where PRF is the pulse repetition frequency. The coherent integration gain ($G_{ci}$) equals $N_P$ for $T_{CI} \ll \tau_0$. Graphs 806, 808, 810, and 812 are provided for a look with the number of pulses per dwell equal to 3, 10, 30, and 100 ($N_P$=3, 10, 20, and 100), respectively. For atmospheric turbulence, coherent integration period (i.e., dwell period) should be no longer than $t_0/2$ in some embodiments. In some embodiments, the atmosphere decorrelates RCS dwell-to-dwell and Swerling 2 statistics are achieved. Table 1 below shows the coherent integration time per decorrelation time ($T_{CI}/\tau_0$) for 1 dB and 3 dB losses for Power Spectral Density associated with a Gaussian spectrum, an $f^{-4}$ spectrum, and a von Karmen spectrum. The $f^4$ spectrum is between the Gaussian spectrum and the von Karmen spectrum.

TABLE 1

Environmental Limit on Coherent Integration Period

| Power Spectral Density | 1-dB Loss (NP > 10) | 3-dB Loss (NP > 10) |
|---|---|---|
| Gaussian | TCI/$\tau_0$ ≤ 1.3 | TCI/$\tau_0$ ≤ 2.9 |
| f-4 | TCI/$\tau_0$ ≤ 1.1 | TCI/$\tau_0$ ≤ 2.8 |
| von Karmen | TCI/$\tau_0$ ≤ 0.48 | TCI/$\tau_0$ ≤ 2.4 |

Figure 8:
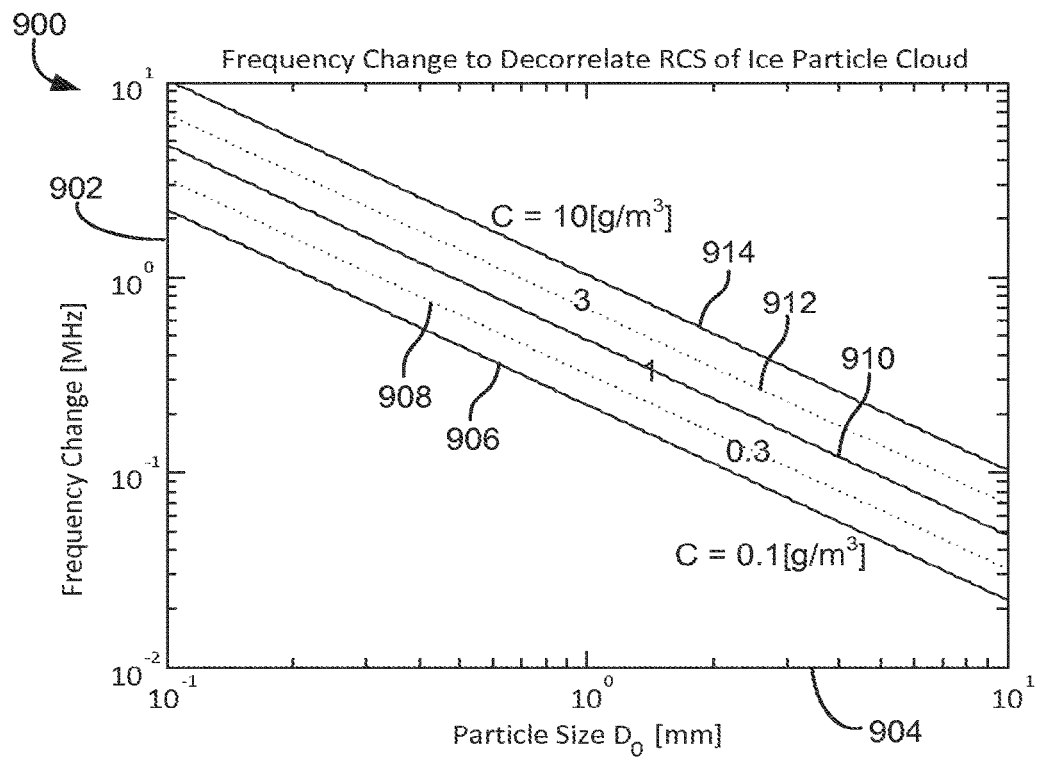
FIG. 8 is a chart showing frequency change to decorrelate radar cross section of an ice particle cloud versus particle size for a number of cloud densities for the radar system illustrated in FIG. 3 according to some embodiments.

With reference to FIG. 8, a chart 900 includes a Y axis 902 representing frequency change in megahertz (MHz) on a logarithmic scale and an X axis 904 representing particle size in millimeters on a logarithmic scale. Lines 906, 908, 910, 912 and 914 are provided for clouds having an ice concentration (C) of 0.1 grams per meter cubed (g/m³), 0.3 g/m³, 1.0 g/m³, 3.0 g/m³, and 10 g/m³, respectively. The frequency change required to change phase relationship by $\pi/4$ of adjacent particles separated by mean distance 1 is given by the following equation: $\Delta\Phi = 2\pi l/\lambda_2 - 2\pi l/\lambda_1 = 2\pi l \Delta f/c = \pi/4$ where $\Delta f = c/8l$; where c is speed of light. The mean number of particles per unit volume is $n \sim 1/l^3$; where n=C/$\rho_\varepsilon \pi D_0^3/6$; C=Mass concentration (g/m³); $\rho_\varepsilon$=density of the particle (g/m$^3$); and $D_0$=Average particle size. The required frequency change to decorrelate RCS is equal to: $\Delta f = c/8[C/\rho_\varepsilon \pi D_0^3/6]^{(1/3)}$. Accordingly, frequency hops of plus or minus four or eight MHz around center frequency are sufficient for the radar system to decorrelate ice/ash cloud RCS except at unreasonably high concentrations or small mean particle sizes in some embodiments.

Figure 9:
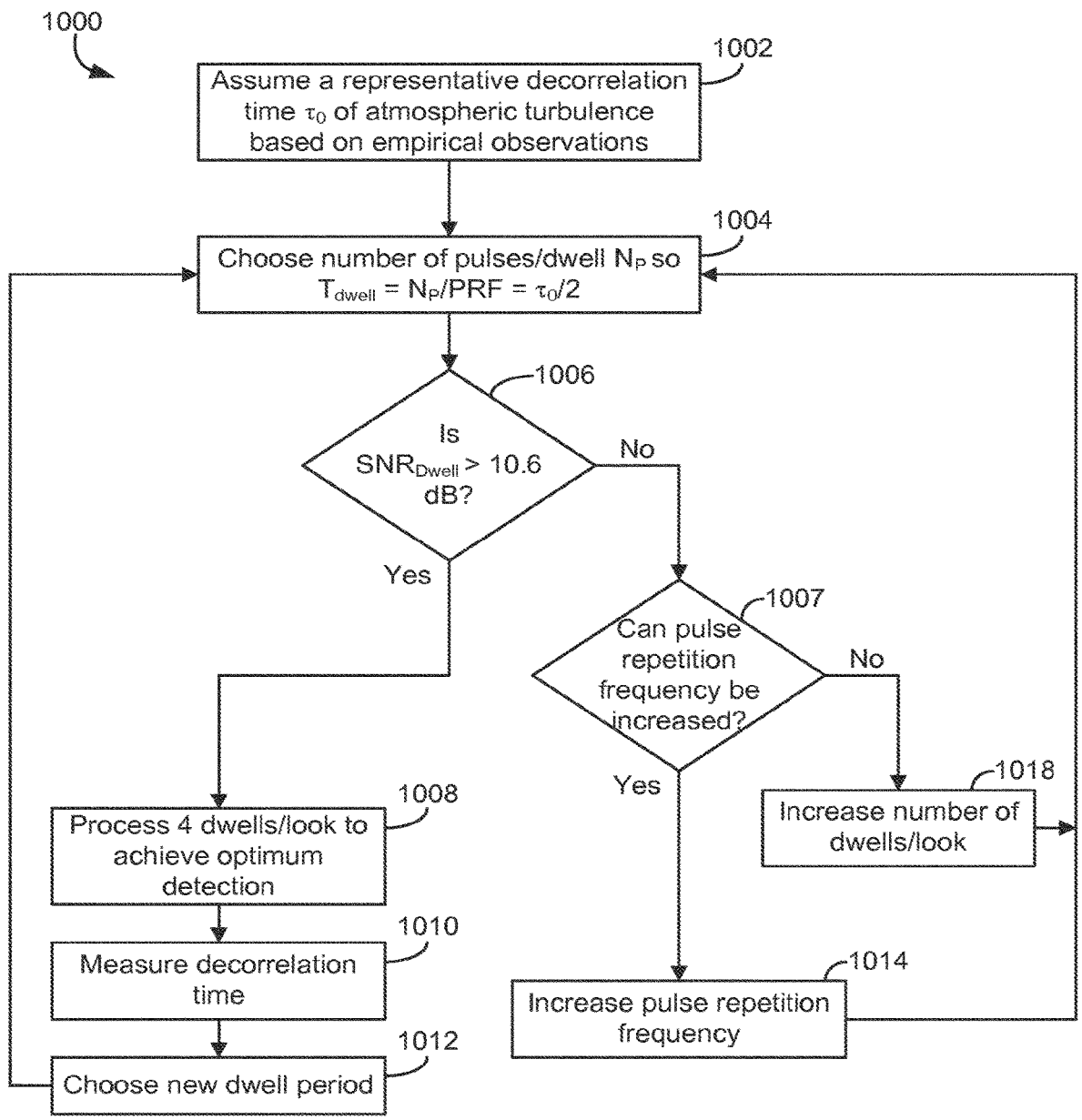
FIG. 9 is a flow diagram showing a particle detection operation for the radar system illustrated in FIG. 3 according to some embodiments.

With reference to FIG. 9, the processing electronics 304 and the particle detector 340 (FIG. 3) can operate according to a flow 1000 for detecting particle conditions such as HVB or smoke conditions. At an operation 1002, the radar system 300 and the particle detector 340 selects a representative decorrelation time $\tau_0$ of atmospheric turbulence (e.g., based on empirical observations). In some embodiments, $\tau_0$ is 10 to 100 milliseconds. The operation 1002 can begin after the radar system 300 has identified a suspect area in some embodiments. The suspect area can be input by a user, provided by an external source (e.g., from other aircraft or a terrestrial source), or sensed by the radar system 300 in some embodiments. In some embodiments, low level reflectivity levels or cell formations (e.g., cumulonimbus anvil regions) associated with HAIC areas can indicate a suspect area.

At an operation 1004, the radar system 300 and the particle detector 340 choose the number of pulses per dwell $N_P$ so $T_{Dwell}=N_P/PRF=\tau_0/2$ in some embodiments, where PRF is pulse repetition frequency and $T_{Dwell}$ is the period of the dwell. At the operation 1004, the radar system 300 and the particle detector 340 provide the radar signal, receive the radar returns and determine the SNR per dwell ($SNR_{Dwell}$) where $SNR_{Dwell}=N_P*SNR_P$ wherein $SNR_P$ is the signal-to-noise ratio of a return pulse. At an operation 1006, if the $SNR_{Dwell}$ is greater than 10.6 dB, the radar system 300 and the particle detector 340 proceed to an operation 1008. If not, the radar system 300 and the particle detector 340 proceed to an operation 1007. At the operation 1007, if the pulse repetition frequency can be increased (the pulse repetition frequency has not reached its maximum), the radar system 300 and the particle detector 340 proceed to an operation 1014 and increase the pulse repetition frequency to achieve 10.6 dB $SNR_{Dwell}$. After operation 1014, the radar system 300 provides pulses according to the operation 1004. At the operation 1007, if the pulse repetition frequency cannot be increased (the pulse repetition frequency has reached its maximum), the radar system 300 and the particle detector 340 proceed to an operation 1018 and increase the number of dwells per look ($N_D$) (e.g., according to FIG. 6 to increase the signal to noise ratio per look and to achieve the desired probability of detection (>0.6)). After the operation 1018, the radar system 300 provides pulses according to the operation 1004.

At the operation 1008, the radar system 300 and the particle detector 340 process four dwells per look to achieve optimum detection. Each dwell can be at different frequency and/or separated sufficiently in time to decorrelate the radar cross section. At an operation 1010, the radar system 300 and the particle detector 340 measure decorrelation time and repeat operations 1004-1010 with a better choice for the dwell period (i.e., number of coherent pulses per dwell) at an operation 1012.

The decorrelation period or time can be measured in the operation 1010 according to a variety of techniques. Autocorrelation of a time history of pulses can be used to measure the decorrelation time (e.g., the 1/e point of the autocorrelation function) in some embodiments. A Fourier transform on received return data can be used to determine how quickly the atmosphere is changing for a decorrelation time. For example, a Fourier transform on return pulses provides a Doppler spread that is an inverse measure of the decorrelation time.

In the operation 1008, the dwells are processed to determine the presence of HVB conditions. Generally, particles in a HVB condition have various sizes and shapes. Cross sectional area of targets using dual polarization techniques can be used to discriminate the type HVB condition in some embodiments. Relatively larger sizes in the horizontal direction as opposed to the vertical direction indicate icing conditions while ash conditions have less oblong shapes in some embodiments. Further, bird targets can be discriminated by larger sizes in some embodiments. Responses at various frequencies and comparisons thereof can be compared to empirical data to discriminate types of HVB conditions in some embodiments. For non-spherical ice particles, the radar cross section (RCS) depends on polarization in some embodiments. H polarization has an e-vector in the X-Y plane, and vertical polarization has an e-vector in the Z direction.

Frequency diversity provides additional information on particle sizes and ice water content for more accurate discrimination and fewer false alarms in one embodiment. Due to differences in scattering regimes such as Rayleigh and Mie scattering, particles have different radar reflectivities at different wavelengths. Comparison of reflectivity for two or more frequencies provides information on average particle size. For example, transition from Rayleigh and Mie scattering depends on frequencies and particle shape to a minor extent. Comparison of reflectivity for two or more frequencies provides information on the average particle size in a fixed particle size cloud.

In some embodiments, returns can be compared to historical return characteristics at varying polarizations and frequencies to determine a match. The historical returns can be provided on a location by location or geographic type basis (e.g., continental, maritime, etc.). In one embodiment, ice particles in globe-like sphere form have a long dimension that is aligned in accordance with aerodynamic forces and/or electric fields associated with weather cells. Generally, a larger variation between horizontal and vertical polarization can mean a higher probability of ice presence. By comparing returns in horizontal or vertical polarizations, asymmetric particles can be distinguished from symmetric particles (e.g., super cooled water drops) or clouds containing asymmetrical particles (e.g., ice) can be distinguished from clouds not containing asymmetric particles.

Generally, larger particle sizes indicate a presence of ice as super cooled water tends to be small and spherical. Accordingly, the dual frequency technique provides information about size of particles for determination of a $HAIC^2$ and HAIC condition. In one embodiment, the frequency difference between the two bands is large to provide better distinction between returns and particle sizes. Cross sectional area of targets using dual polarization techniques can be used to discriminate the type HVB condition in some embodiments. Responses at various frequencies and comparisons thereof can be compared to empirical data to discriminate types of HVB conditions in some embodiments.

In some embodiments, the flow 1000 can use information from other sensors to improve detection of HVB conditions. In some embodiments, the flow 1000 can use satellite cloud top information to identify an expected location for ice and satellite infrared information on volcanic ash extent to identify an expected location for ash. Positive identification from multiple sensors can be used to increase confidence in detection and improve detection. A lack of external sensor data can be used to reduce false alarms (e.g., if the satellite sensor does not see any clouds, then the radar system 300 may disqualify an ice condition warning).

Figure 10:
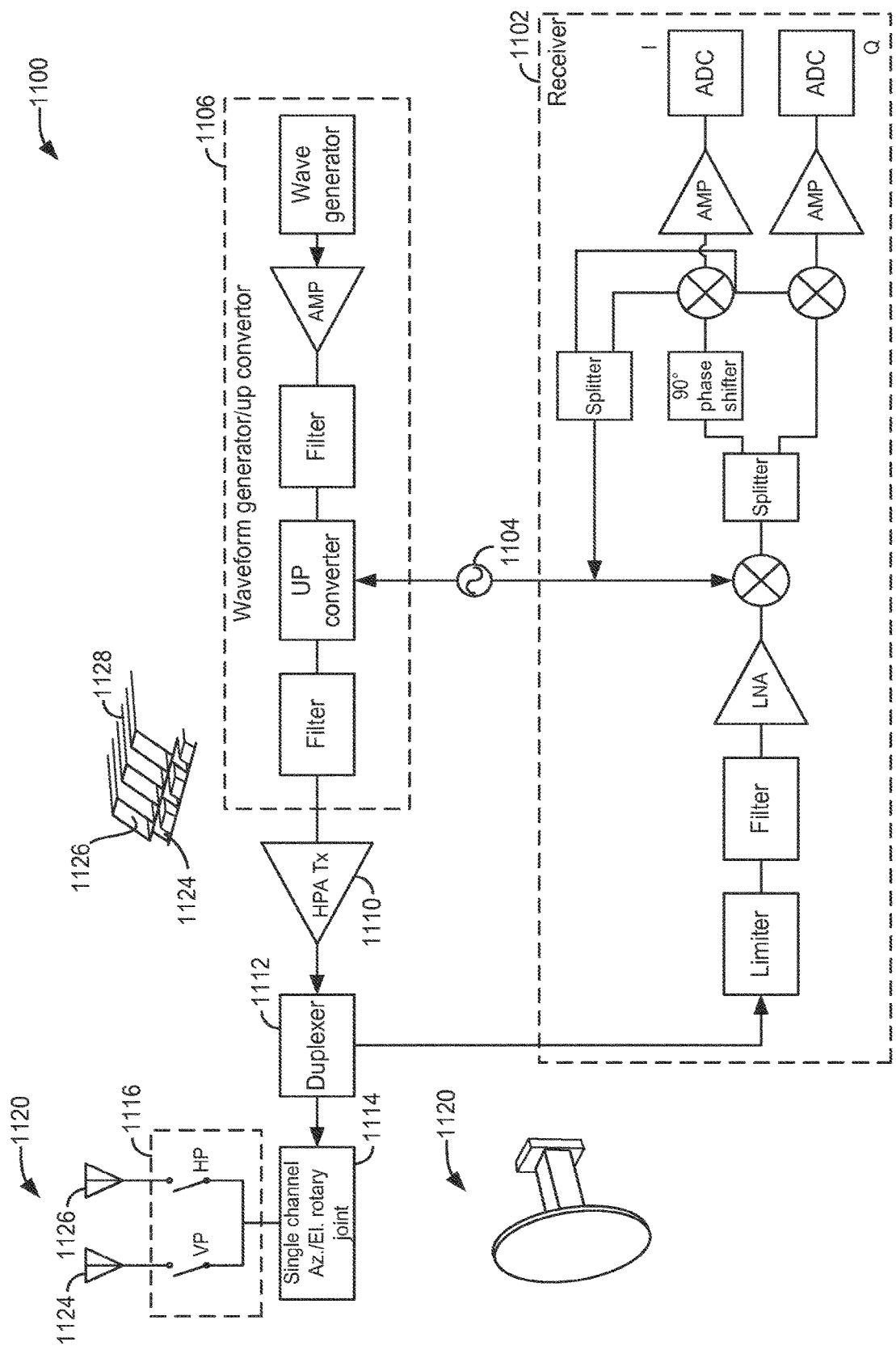
FIG. 10 is a more detailed block diagram of a single channel, multi-polarization radar system for use as the radar system illustrated in FIG. 3 in accordance with some embodiments.

With reference to FIG. 10, a single channel, multi-polarization radar system 1100 can be used in the radar system 300. The radar system 1100 includes a weather radar receiver (WxR) 1102, a local oscillator 1104, a waveform generator 1106, a transmit amplifier 1100, a duplexer 1112, a single channel azimuth/elevation joint 111, and an antenna system 1120. The radar receiver can provide I and Q data associated with radar returns to the electronic processor 304 in some embodiments. The antenna system 1120 includes a polarization switch 1116 a horizontal polarization element 1126 and a vertical polarization element 1124. A representation 1128 shows the horizontal polarization element 1126 and the vertical polarization element 1124. In some embodiments, the antenna system 1120 is a mechanically scanned waveguide antenna. The polarization switch 1116 can configure the antenna system 1120 for vertical polarization, horizontal polarization or 45 degree slant linear. The polarization switch 1116 can have a horizontal polarization port and a vertical polarization port, each of which can be switched on and off. This architecture enables tri-state polarization detection in a single channel in a relatively inexpensive radar system. The variously polarized radar returns are sufficiently correlated as long as the polarization switch has an appropriate switching speed. By comparing the returns in the three polarization states (horizontal, vertical and 45-degree), estimates can be made of the deviation of the particles from spherical shapes, an indicator of particle type, and orientation of the long particle axis if non-spherical shape. Non-horizontal orientation of particles is an indication of strong vertical winds or strong electric fields, both of which can be dangerous to aircraft.

An X-band rotary joint can be removed if radio frequency circuitry is mounted to the back of antenna system 1120. In some embodiments, single channel rotary joints are utilized. The antenna system 1120 can include an antenna array, such as those disclosed in U.S. Pat. Nos. 8,098,189 and 7,436,361 incorporated herein by reference in their entirety, an active electronically scanned array (AESA), or a passive electronically scanned array (PESA). The antenna system 1120 can be a dual orthogonal linear polarization (DOLP) antenna using DOLP strip line slots, DOLP micro strip patches, or interlaced waveguide sticks radiators for DOLP in some embodiments.

Figure 11:
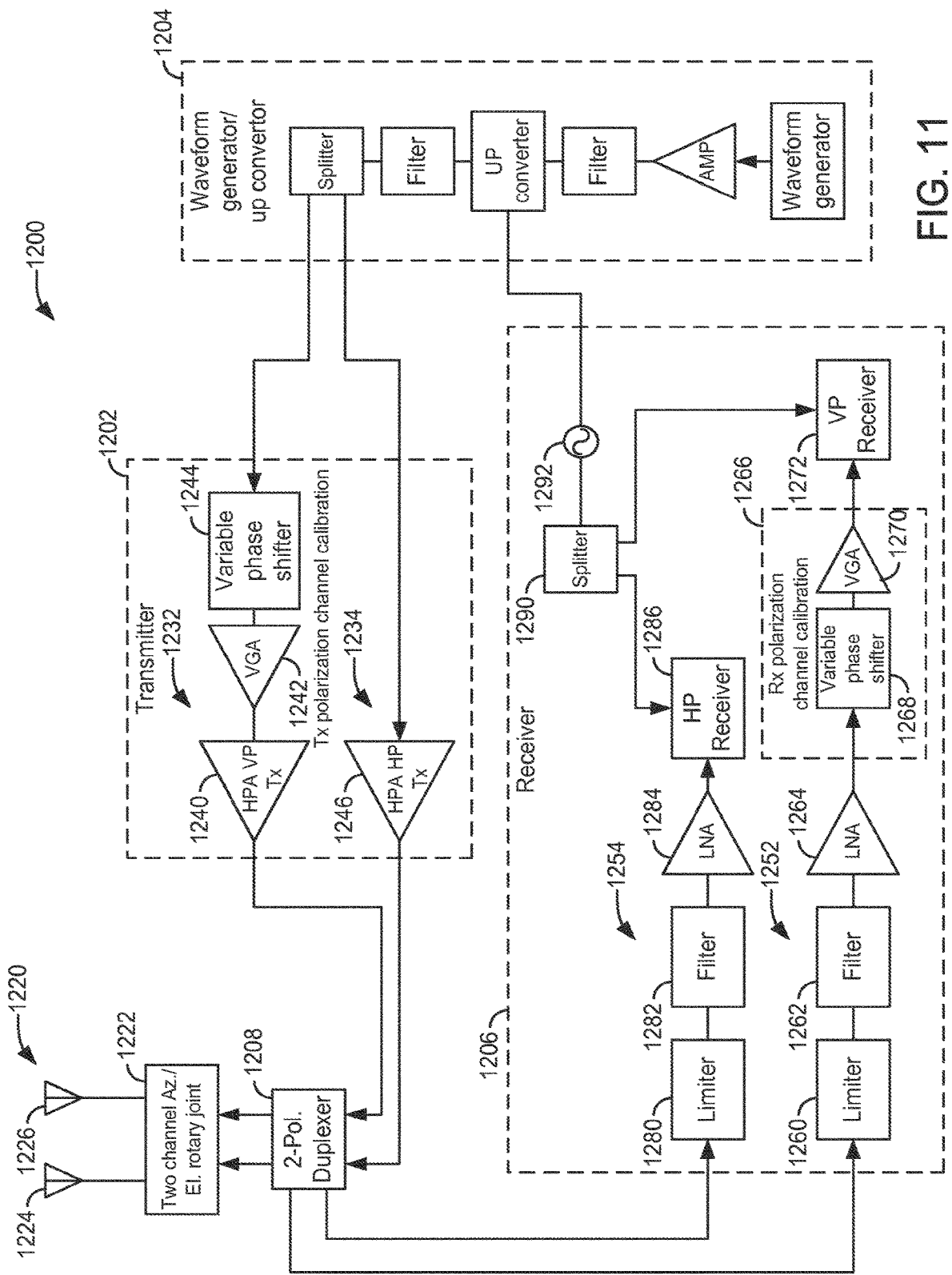
FIG. 11 is a more detailed block diagram of a dual channel, multi-polarization radar system for use as the radar system illustrated in FIG. 3 in accordance with some embodiments.

With reference to FIG. 11, a dual channel, multi-polarization radar system 1200 can be used in the radar system 300. The dual channels can be DOLP channels calibrated for the same insertion loss and phase loss in some embodiments. The radar system 1200 includes a weather radar receiver (WxR) 1206, a waveform generator 1204, a transmitter 1202, a two polarization duplexer 1208, a two channel azimuth/elevation joint 1222, and an antenna system 1220. The antenna system 1220 includes a horizontal polarization antenna element 1224 and a vertical polarization antenna element 1226. The two channel azimuth/elevation joint 1222 provides simultaneously horizontal and vertical polarization returns and can be comprised of two horizontally abutted single axis rotary joints and two vertically stacked single axis rotary joints in some embodiments In some embodiments, the transmitter 1202 includes a vertical polarization channel 1232 including a vertical polarization amplifier 1240, a variable gain amplifier 1242, and a variable phase shifter 1244. In some embodiments, the transmitter 1202 includes a horizontal polarization channel 1234 including a horizontal polarization amplifier 1246.

In some embodiments, the receiver 1206 includes a vertical polarization channel 1252 including a limiter 1260, a filter 1262, low noise amplifier 1264, a polarization calibration circuit 1266, and a vertical polarization receiver 1272. The polarization calibration circuit 1266 includes a variable phase shifter 1268, and a variable gain amplifier 1270. In some embodiments, the receiver 1206 includes a splitter 1290 and an oscillator 1292. In some embodiments, the receiver 1206 includes a horizontal polarization channel 1254 including a limiter 1280, a filter 1282, a low noise amplifier 1284, and a horizontal polarization receive 1286. The electronic processor 304 (FIG. 3) can receive the radar return data from the receivers 1286 and 1272.

Figure 12:
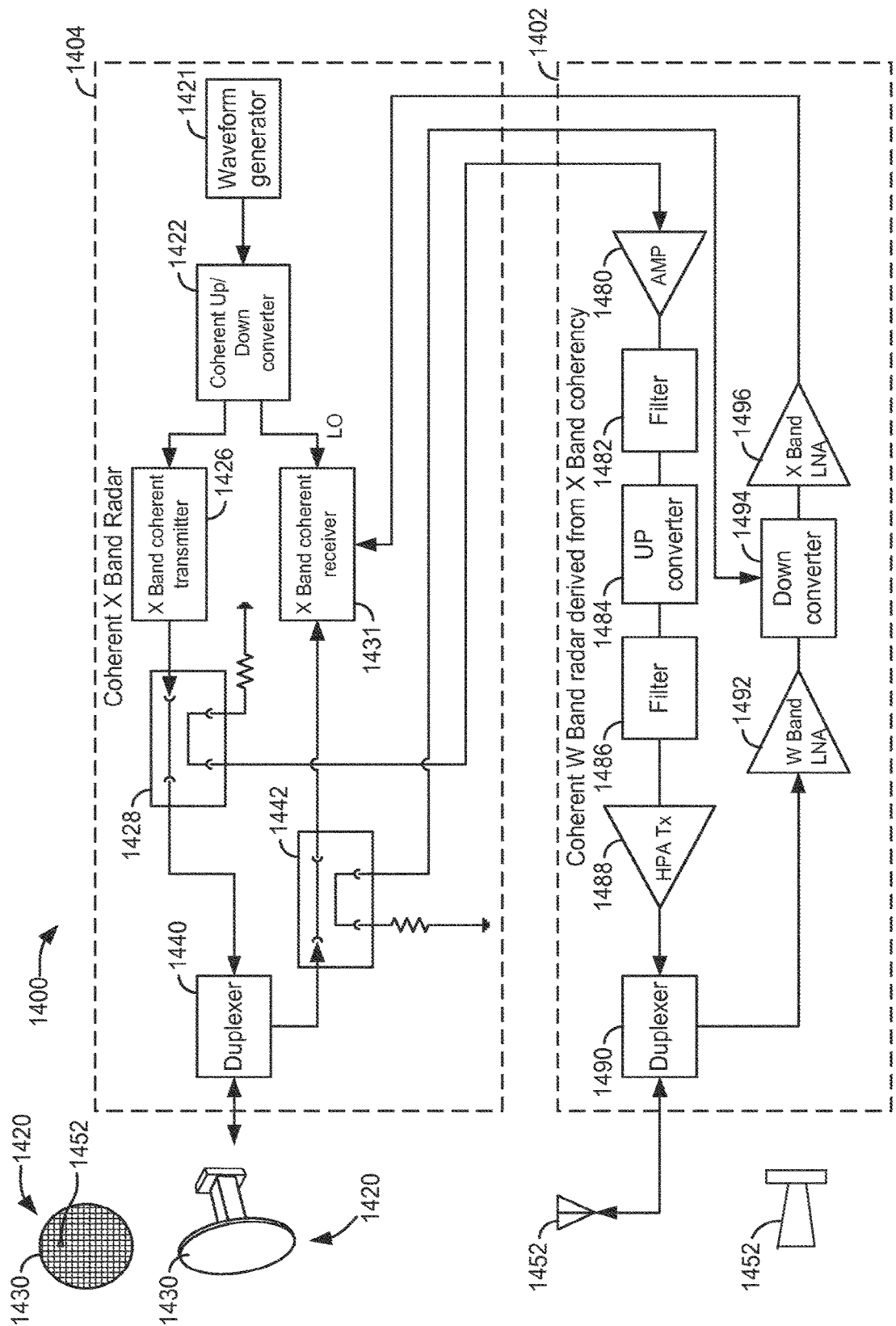
FIG. 12 is a more detailed perspective view schematic drawing of a dual band radar system for use as the r radar system illustrated in FIG. 3 in accordance with some embodiments.

With reference to FIG. 12, a dual band, single polarization radar system 1400 can be used in the radar system 300. The radar system 1400 includes a coherent W-band weather radar transmitter/receiver 1402, a coherent X-band weather radar transmitter/receiver 1404, and an antenna system 1420. The antenna system 1420 includes an X-band single polarization antenna 1430 and a W-band single polarization antenna 1452. The W-band antenna 1452 can be disposed in the X-band antenna 1430. The antennas 1430 and 1452 can be multipolarization antennas, and the transmitter/receivers 1402 and 1404 can include multiple channels for each polarization. The processing electronics 304 (FIG. 3) can receive the radar return data from the X-band coherent receiver 1431 in some embodiments. In some embodiments, the dual band, single polarization radar system 1400 provides completely coherent systems for multiple frequency band and multiple polarizations, all derived off a common reference signal. An existing X Band radar product line can be used a platform for the radar system 1400 with modifications to the X Band radar portion as described herein and shown in FIG. 12.

In some embodiments, the coherent X-band weather radar transmitter/receiver 1404 includes a waveform generator 1421, a coherent up/down converter 1422, an X-band coherent transmitter 1426, an X-band coherent receiver 1431, a transmitter derivation circuit 1428, a duplexer 1440, and a receiver derivation circuit 1442. In some embodiments, the coherent W-band weather radar transmitter/receiver 1402 includes an amplifier 1480, a filter 1482, an up converter 1484, a filter 1486, a transmit amplifier 1488, a duplexer 1490, a receive low noise amplifier 1492, a down converter 1494, and an X-band low noise amplifier 1496. In some embodiments, the coherent W-band weather radar transmitter/receiver 1402 receives an X-band transmit signal from the transmitter derivation circuit 1428 from which a W-band transmit signal is provided via the filter 1482, the up converter 1484, the filter 1486, the transmit amplifier 1486, and the duplexer 1488. In some embodiments, the coherent W-band weather radar transmitter/receiver 1402 uses an X-band receive signal from the receiver derivation circuit 1428 to down convert a W-band receive signal to an X-band receive signal provided via the down converter 1494 and the X-band low noise amplifier 1496 to the receiver 1430. The W-band signal is received via the duplexer 1490 and the amplifier 1492, is down converted by the down converter 1494 and provided by the X-band low noise amplifier 1496 to the X-band coherent receiver 1431.

In some embodiments, radar system 1400 can provide and receive signals in the C band or the Ka band. The radar system 1400 can be a X/Ka, X/S, or X/C system in some embodiments. Processing for the dual bands can be slaved together with a common processor for both bands or a master processor driving transmitter/receivers 1402 and 1404.

In some embodiments, the W-band antenna element 1452 and the X-band antenna element 1230 are AESAs or PESAs in some embodiments. In some embodiments, the two channel architecture associated with radar system 1200 can be applied to system 1400 to provide a multiband, multi-channel, multipolarization system.

Figure 13:
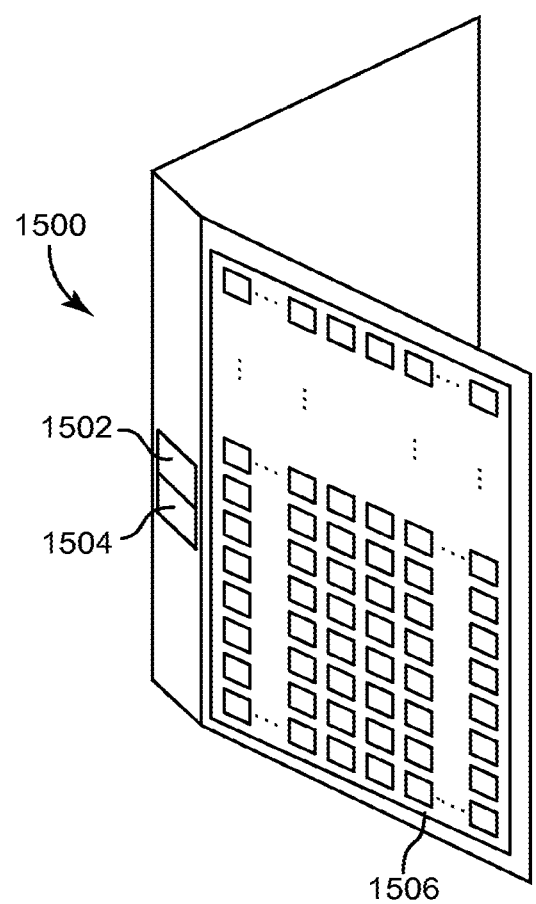
FIG. 13 is a more detailed top view schematic drawing of a dual band wedge antenna for use with the radar system illustrated in FIG. 12 in accordance with some embodiments.

With reference to FIG. 13, the antenna system 1420 can be a wedge shaped antenna system 1500 including a W-band vertical polarization PESA 1502, a W-band horizontal polarization PESA 1502, and one or more X-band dual or single polarization AESA panels 1506. The W-band vertical polarization PESA 1502 and the W-band horizontal polarization PESA 1502 can be disposed on a blunt nose 1510 of antenna system 1500.

Figure 14:
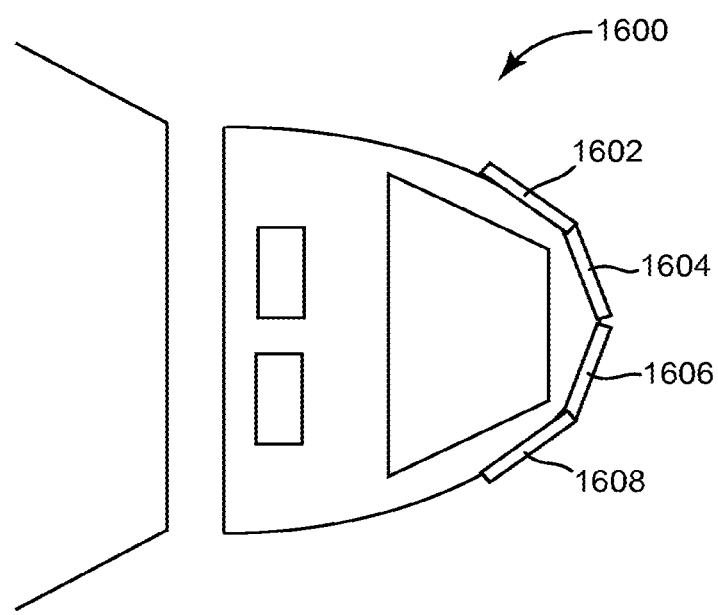
FIG. 14 is a more detailed top view schematic drawing of a smart cone for use with the r radar system illustrated in FIG. 3 in accordance with some embodiments.

With reference to FIG. 14, a nose cone 1600 can be provided with panel antennas for the radar system 300. The nose cone 1600 can be used to provide antenna systems 1420 and 1500 in some embodiments. The nose cone 1600 is discussed in U.S. Pat. No. 9,118,112, incorporated herein by reference. Panels 1602, 1604, 1606, and 1608 can be AESA or PESA antennas for the radar system 300 (FIG. 3) in some embodiments. The panels 1602, 1604, 1606, and 1608 can be multipolarization and/or multiple band antennas in some embodiments.

Independent radar systems for dual polarization, or dual/tri-band frequency diversity, or both can be self-contained coherent systems in some embodiments. In some embodiments, the ratio of phase can also be utilized for both dual polarization and/or dual frequency systems. Specific differential phase (e.g., between vertical polarization and horizontal polarization) can be used to identify characteristics associated with HVB conditions in some embodiments.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

According to various exemplary embodiments, electronics 304 may be embodied as hardware and/or software. In exemplary embodiments where the processes are embodied as software, the processes may be executed as computer code on any processing or hardware architecture (e.g., a computing platform that can receive reflectivity data from a weather radar system) or in any weather radar system such as the WXR-2100 system available from Rockwell Collins, Inc. or an RDR-400 system available from Honeywell, Inc. The processes can be performed separately, simultaneously, sequentially or independently with respect to each other.

While the detailed drawings, specific examples, detailed algorithms and particular configurations given describe preferred and exemplary embodiments, they serve the purpose of illustration only. The inventions disclosed are not limited to the specific forms and equations shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

Some embodiments within the scope of the present disclosure may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

What is claimed is:

1. An aircraft hazard warning system, comprising:
   a radar system comprising a radar antenna; and
   a processing system configured to detect a presence of smoke from forest fires, high altitude crystals, volcanic ash, or birds posing a threat to aircraft, the presence being an HVB condition, the processing system being configured to detect the HVB condition using at least two types of radar signals associated with the radar system, the radar system configured to provide radar pulses via the radar antenna with an initial dwell period and receive radar returns associated with the radar pulses via the radar antenna, wherein the processing system is configured to measure a decorrelation time of the received radar returns and to choose a new dwell period based on the decorrelation time, and provide a number of the radar pulses for each of a plurality of dwells for provision of future pulses based upon the new dwell period;
   wherein, the two types of radar signals include a first radar signal at a first polarization and a second radar signal at a second polarization.

2. The aircraft hazard warning system of claim 1, wherein the first polarization is a horizontal polarization and the second polarization is a vertical polarization.

3. The aircraft hazard warning system of claim 2, wherein the radar antenna is a dual purpose antenna.

4. The aircraft hazard warning system of claim 3, wherein the dual purpose antenna is electronically steerable.

5. The aircraft hazard warning system of claim 2, wherein the HVB condition is detected by matching a polarization ellipse to an orientation and a shape of a particle.

6. The aircraft hazard warning system of claim 2, wherein the received radar returns associated with the radar pulses are compared to distinguish one or more asymmetric particles from one or more symmetric particles.

7. The aircraft hazard warning system of claim 6, wherein a variance between the received radar returns are used to detect a presence of the high altitude crystals.

8. The aircraft hazard warning system of claim 2, further comprising a third polarization, wherein the third polarization is a 45-degree polarization.

9. The aircraft hazard warning system of claim 8, wherein the received radar returns associated with the radar pulses are used to determine at least one of a deviation from a spherical shape, an indicator of a particle type, or an orientation of a long particle axis.

10. The aircraft hazard warning system of claim 9, further configured to provide a notification of a presence of at least one of vertical winds or electric fields.

11. An aircraft hazard warning system, comprising:
a radar system;
a processing circuit configured to detect a presence of smoke from forest fires, high altitude crystals, volcanic ash, or birds posing a threat to aircraft, the presence being an HVB condition, the processing circuit being configured to detect the HVB condition using at least two types of radar signals, the radar system being configured to provide radar pulses via a radar antenna of the radar system with an initial dwell period and to receive radar returns associated with the radar pulses via the radar antenna, wherein the processing circuit is configured to:
measure a first decorrelation time of the received radar returns;
choose a new dwell period based on the first decorrelation time;
choose a number of pulses per dwell based on the new dwell period of the radar returns for a future provision of the pulses per dwell;
receive radar return data associated with the radar returns associated with the number of pulses per dwell provided via the radar antenna of the radar system;
determine if a signal-to-noise ratio of the radar returns associated with the number of pules per dwell is above a threshold; and
process the radar return data to detect a particle condition;
wherein the pulses include a first polarization signal and a second polarization signal.

* * * * *